(12) United States Patent
Massault et al.

(10) Patent No.: US 9,746,600 B2
(45) Date of Patent: Aug. 29, 2017

(54) ILLUMINATING GLAZING WITH INCORPORATED DEFLECTOR

(71) Applicant: SAINT-GOBAIN GLASS FRANCE, Courbevoie (FR)

(72) Inventors: Laetitia Massault, Magny les Compiegne (FR); Pascal Bauerle, Roye (FR); Christophe Kleo, Attichy (FR); Adële Verrat-de-Bailleul, Villers-sur-Coudun (FR); Mathieu Berard, Paris (FR); Brice Dubost, Courbevoie (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 8 days.

(21) Appl. No.: 14/399,826

(22) PCT Filed: May 3, 2013

(86) PCT No.: PCT/FR2013/050990
§ 371 (c)(1),
(2) Date: Nov. 7, 2014

(87) PCT Pub. No.: WO2013/167832
PCT Pub. Date: Nov. 14, 2013

(65) Prior Publication Data
US 2015/0160400 A1    Jun. 11, 2015

(30) Foreign Application Priority Data
May 10, 2012  (FR) ..................... 12 54297

(51) Int. Cl.
*F21V 8/00* (2006.01)
*B32B 17/10* (2006.01)
(Continued)

(52) U.S. Cl.
CPC ...... *G02B 6/0038* (2013.01); *B32B 17/10036* (2013.01); *B32B 17/10541* (2013.01);
(Continued)

(58) Field of Classification Search
CPC .... B60Q 3/0203; B60Q 3/0213; B60Q 3/004; B60Q 1/268; B32B 17/10541;
(Continued)

(56) References Cited

U.S. PATENT DOCUMENTS 5,587,816 A * 12/1996 Gunjima ............... F21V 9/14
349/113
8,021,009 B2 * 9/2011 Knoll ................. A47F 3/001
362/602
(Continued)

FOREIGN PATENT DOCUMENTS

DE  20202435 U1 * 6/2002 ............ B60Q 3/004
DE  101 47 267 A1    4/2003
(Continued)

OTHER PUBLICATIONS

International Search Report issued in International Application No. PCT/FR2013/050990, dated Jul. 5, 2013.
(Continued)

*Primary Examiner* — Hargobind S Sawhney
(74) *Attorney, Agent, or Firm* — Pillsbury Winthrop Shaw Pittman LLP

(57) ABSTRACT

A lighting glazing includes a first sheet of glass of refractive index n1 with a first main face, a second main face and a rim; a transparent polymer film in adhesive contact with the second main face of the first sheet, the film having a refractive index n2<n1; a light source positioned facing the rim of the first sheet of glass, wherein an area of the second main face of the first sheet of glass is provided with a reflecting relief or else is covered with a transparent flat structure, of refractive index n3 greater than or equal to n1, provided with a reflecting relief.

27 Claims, 2 Drawing Sheets

Figure 1:
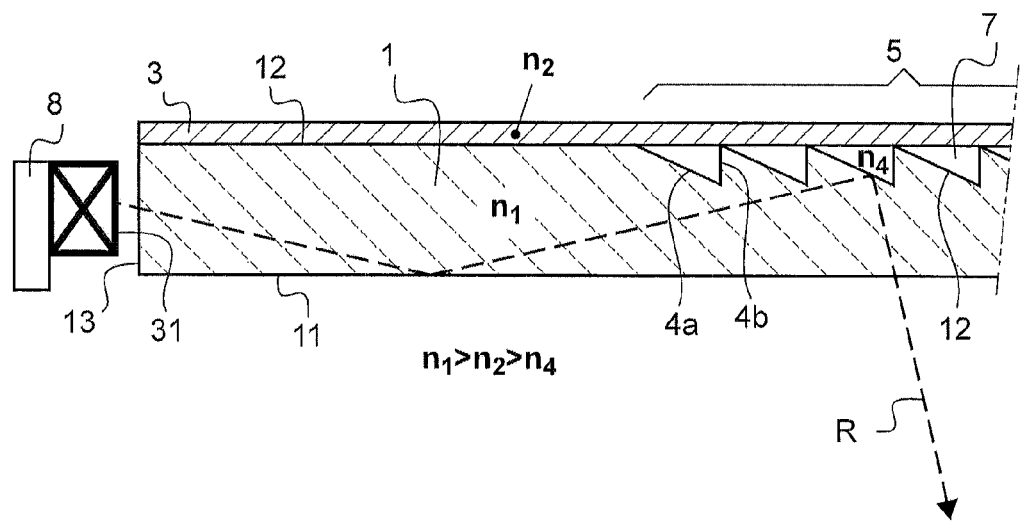

(51) Int. Cl.
*B60Q 3/51* (2017.01)
*B60Q 3/64* (2017.01)
*B60Q 3/208* (2017.01)

(52) U.S. Cl.
CPC .............. *B60Q 3/208* (2017.02); *B60Q 3/51* (2017.02); *B60Q 3/64* (2017.02); *G02B 6/0073* (2013.01); *G02B 6/0095* (2013.01)

(58) Field of Classification Search
CPC .......... B32B 17/1055; B32B 17/10036; B32B 17/10018; B32B 17/10064; B32B 17/10045; B32B 2369/00; B32B 3/10; B32B 7/12; B32B 17/10293; G02B 6/0011; G02B 6/0038; G02B 6/0033; G02B 6/0073; G02B 6/0091; G02B 6/0095; G02B 6/0036; G02B 6/0068; G02B 6/0015; G02B 6/0035; G02B 6/0053; F21V 8/00; F21Y 2103/10; G02F 1/133615; F21S 48/2243
See application file for complete search history.

(56) References Cited

U.S. PATENT DOCUMENTS

| | | | | |
|---|---|---|---|---|
| 8,314,546 B2* | 11/2012 | Tchakarov | ........ | B32B 17/10155 313/504 |
| 2002/0167820 A1* | 11/2002 | Haering | ................. | B60Q 3/004 362/551 |
| 2002/0180910 A1* | 12/2002 | Umemoto | ............ | G02B 6/0036 349/113 |
| 2005/0239581 A1* | 10/2005 | Naylor, Sr. | ............ | A63B 71/06 473/447 |
| 2006/0209551 A1* | 9/2006 | Schwenke | ............... | B32B 27/08 362/503 |
| 2007/0098969 A1* | 5/2007 | Ansems | ............ | B32B 17/10036 428/212 |
| 2010/0139165 A1* | 6/2010 | Oyama | .................. | A01G 7/045 47/1.01 R |
| 2010/0278480 A1 | 11/2010 | Vasylyev | | |

FOREIGN PATENT DOCUMENTS

| | | | | |
|---|---|---|---|---|
| EP | 1 533 632 A1 | | 5/2005 | |
| EP | 1 903 359 A2 | | 3/2008 | |
| FR | 2 899 954 A1 | | 10/2007 | |
| FR | 2955539 A1 | * | 7/2011 | ....... B32B 17/10018 |
| FR | 3003196 A1 | * | 9/2014 | ....... B32B 17/10266 |
| JP | 63293509 A | * | 11/1988 | |
| JP | 02251913 A | * | 10/1990 | |
| JP | 2009-540603 A | | 11/2009 | |
| WO | 2007/077099 A1 | | 7/2007 | |
| WO | 2010/097110 | | 9/2010 | |
| WO | 2011/092419 A1 | | 8/2011 | |
| WO | 2012/028820 A1 | | 3/2012 | |

OTHER PUBLICATIONS

Notice of Reasons for Rejection as issued in Japanese Patent Application No. 2015-510858, dated Apr. 4, 2017.

* cited by examiner

ILLUMINATING GLAZING WITH INCORPORATED DEFLECTOR

CROSS-REFERENCE TO RELATED APPLICATIONS

This application is the U.S. National Stage of PCT/FR2013/050990, filed May 3, 2013, which in turn claims priority to French Application No. 1254297, filed May 10, 2012. The contents of all of these applications are incorporated herein by reference in their entirety.

The present invention relates to a lighting glazing, in particular a glazing for vehicles, capable of emitting light in an oriented manner.

It is known practice to incorporate light-emitting diode modules (LED modules) at the edge of single-sheet or laminated glazing, in such a way that the light emitted by the LEDs enters through the rim of a sheet of glass and is guided thereby to a diffusing element, also called light extraction means.

These lighting glazings often have an ambient lighting function. The light extraction means in fact diffuses light, extracted from the lit sheet, without distinction in all directions. In some cases, it may however be desired, even necessary, to limit the diffusion angle of the extracted light. Thus, for example in the housing domain, when there is a desire to light a particular decorative element to enhance it, or else in the automobile domain when there is a desire to light an area of the passenger compartment, in proximity to a passenger, without inconveniencing the other passengers, and in particular the driver.

It would of course be possible to consider orienting the diffuse light, extracted from the waveguide sheet, by a deflector fixed to one of the faces of the lit sheet in proximity to the diffusing element. Such a solution would, however, be unsatisfactory from an aesthetic viewpoint because such a deflector, opaque, would protrude from the glazing and would significantly degrade the impression of flatness and of transparency of the glazing when the light source is off.

The present invention is based on the idea of incorporating the deflector function in the core of the glazing by figuring, in a limited area of the glazing, one of the main faces of the lit sheet as a relief comprising geometrical patterns provided with a reflecting interface and capable of orienting the light. For this area to act effectively as deflector a very great majority of the reflection of the light must be of specular type.

The term "reflecting interface" here describes
either the interface between the lit sheet and a solid medium in contact therewith,
or the interface between a flat structure attached to the lit sheet and a solid medium in contact with this flat structure; for the light to be able to pass freely from the lit sheet into this attached flat structure, the latter must have a refractive index greater than or equal to the refractive index of the lit sheet.

The subject of the present invention is more particularly a lighting glazing comprising
a first sheet of glass of refractive index $n_1$ with a first main face, a second main face and a rim;
a transparent polymer film in adhesive contact with the second main face of the first sheet, said film having a refractive index $n_2 < n_1$;
a light source, preferably a light-emitting diode module (LED module), positioned facing the rim of the first sheet of glass, said glazing being characterized in that an area of the second main face of the first sheet of glass is provided with a reflecting relief or else is covered with a flat structure, planar and transparent, of refractive index $n_3$ greater than or equal to $n_1$, provided with a reflecting relief.

Also the subject of the invention is a vehicle, preferably a motor vehicle, comprising such a lighting glazing, the lighting glazing preferably forming part of the roof of the vehicle.

The extent of this relief area which acts as deflector is preferably significantly less than that of the first sheet. It advantageously represents less than 30%, preferably between 1 and 25%, in particular between 1 and 10% of the extent of the first sheet.

The glazing of the present invention can be a single-sheet glazing, preferably of tempered glass, or else a laminated glazing comprising at least two single sheets glued to one another in a known manner by means of a lamination separator. In a preferred embodiment, the glazing of the present invention consequently also comprises a second sheet of glass with a first main face, a second main face and a rim, the transparent polymer film then acting as lamination separator or being in adhesive contact with the second main face of the first sheet of glass and with the first main face of the second sheet of glass.

When the transparent polymer film is a lamination separator it can be made up of materials usually used for this purpose, provided that they have an optical index $n_2$ less than the optical index of the first sheet of glass ($n_1$). Examples of a perfectly suitable material that can be cited include poly(vinylbutyral) which has an optical index of approximately 1.48, that is to say an optical index less than the optical index of mineral glass which is conventionally around 1.5.

It is important to note that, in the following description of the glazing, the term "first sheet" will always denote the sheet of glass lit at its rim by the light source or sources. The first sheet or lit sheet is preferably the one in contact with the interior of the vehicle or of the building.

Each of the two sheets of the glazing of the present invention has a rim and two main faces. The face intended to be oriented toward the interior of the passenger compartment of the vehicle or toward the interior of the building will be called "first main face" and that which will be directed toward the exterior of the building or of the passenger compartment of the vehicle will be called "second main face". When the glazing of the present invention is incorporated neither in the bodywork of a vehicle nor in the wall of a building, this terminology simply means that the first main faces of the two sheets are oriented in the same way.

As already explained in the introduction, the reflecting relief must have a low roughness so that the reflection is essentially of specular type. The relief and roughness of the reflecting interface are chosen in such a way that the total widths at mid-height of the angular distribution of the light intensity emitted by the system are preferably between 30° and 60°. A greater roughness of the reflecting relief will result in a reflection of more diffuse nature and therefore a wider angular distribution, whereas a lesser roughness of the reflecting relief will result in a light reflection of more specular nature and therefore a narrower angular distribution around the specular direction.

The angle of distribution of the light intensity emitted by the device can be measured by the goniophotometric methods well known to those skilled in the art and described for example in the reference documents of the International Lighting Commission "CIE 070-1987 *The Measurement of*

*Absolute Luminous Intensity Distributions*" and "*CIE 121-1996 The Photometry and Goniophotometry of Luminaires*".

In order for the width of the angular distribution of the light intensity to lie within the values sought, it is possible to consider, alternatively or in addition to a roughness of the reflecting relief, arranging a diffusing element in the first sheet, on the second or on the first main face of the first sheet in immediate proximity to the textured area comprising the reflecting relief.

This optional diffusing element moreover presents the aesthetic advantage of masking the texture of the reflecting interface for an observer looking, through the first main face of the first sheet, at the area provided with this reflecting interface.

Independently of the roughness of the reflecting interface, it is possible to define a height or depth of the relief which is equal to the distance between the highest point and the lowest point of said relief.

The height of the reflecting relief is between 5 μm and 1 mm, preferably between 10 μm and 500 μm, in particular between 20 and 100 μm.

The reflecting relief can be the relief of an area of the second main face of the first sheet of glass. It is not easy to manufacture sheets of glass comprising, in a limited area of one of their surfaces, a relatively shallow relief with surfaces appropriately oriented and sufficiently smooth to allow for a specular reflection. Such a relief could be created, for example, by laser etching.

It is considerably easier to create the reflecting relief by applying to the surface of the sheet of glass a preformed flat structure comprising such a relief. Such a transparent flat structure may be a film of plastic material (organic polymer), preferably of poly(ethylene terephthalate), polycarbonate, poly(methylmethacrylate), polystyrene. Such polymer films textured by a relief are available on the market and one example that can be cited is the film Vikuiti® Image Directing Film II marketed by the company 3M.

It is also possible to form a transparent flat structure comprising an appropriate relief by depositing on the surface of the second main surface of the first sheet in a known manner by sol-gel pathway, a silica-based mineral or organo-mineral coating. A relief can be formed on the surface of such a coating by applying a surface with a negative relief during the sol solidification phase, for example in the manner described in WO2008/14322.

The relief, to be able to act as light deflector, must be a reflecting interface. A "reflecting interface" should be understood, in this invention, to be an interface which reflects at least 50% of the visible light. This interface of the relief preferably reflects at least 80%, in particular at least 90% of the visible light.

The reflecting nature of the interface can be obtained, for example, by depositing a reflecting coating, preferably a metallic layer, notably a layer of silver, of copper, of aluminum, of gold, of nickel or of chrome, on the relief of the transparent flat structure or of the surface of the second sheet.

The reflecting nature of the relief can also be due to the fact that the refractive index $n_2$ of the transparent polymer film, which is in contact with the relief, is less than the index $n_1$ of the first sheet of glass or than the index $n_3$ of the flat structure. The Snell-Descartes law ($n_1 \sin \theta_1 = n_2 \sin \theta_2$) makes it possible to calculate the angle of incidence $\theta_1$ beyond which a light ray is totally reflected ($\theta_2=90°$) by an interface between two media of different optical indices. The greater the index difference, the lower $\theta_1$ becomes, that is to say the less a light ray needs to be low-angled to be reflected by the interface. In the present invention, the index $n_2$ is preferably less, by at least 0.02, preferably by at least 0.1, than the index $n_1$ of the first sheet of glass or than the index $n_3$ of the transparent flat structure.

Finally, a third solution, similar to the preceding one, consists in making the relief reflecting by depositing thereon a coating of low index having a refractive index $n_4$ less, by at least 0.02, preferably by at least 0.1, than the index $n_1$ of the first sheet of glass or than the index $n_3$ of the transparent flat structure.

The reflecting relief advantageously comprises a plurality of geometrical patterns consisting of flat or curved surfaces. It is preferably a regular relief with repetitive geometrical patterns, that is to say geometrical patterns having substantially the same shape and substantially equidistant relative to one another.

An example of regular reflecting relief that can be cited is a relief of Fresnel lens type or a relief of Fresnel prism type. A relief of Fresnel prism type is particularly preferred.

Figure 3A:
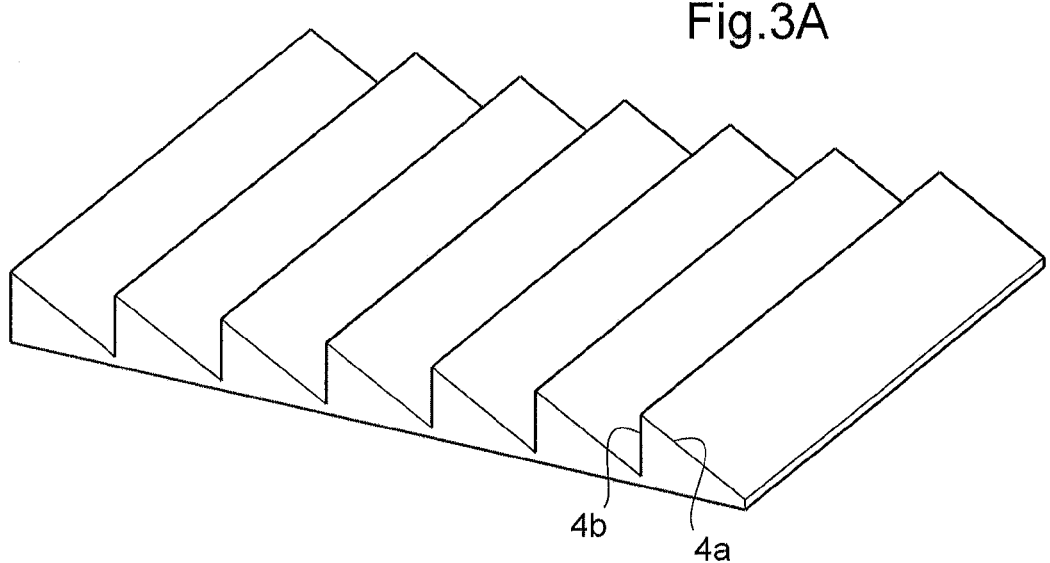
Figure 3B:
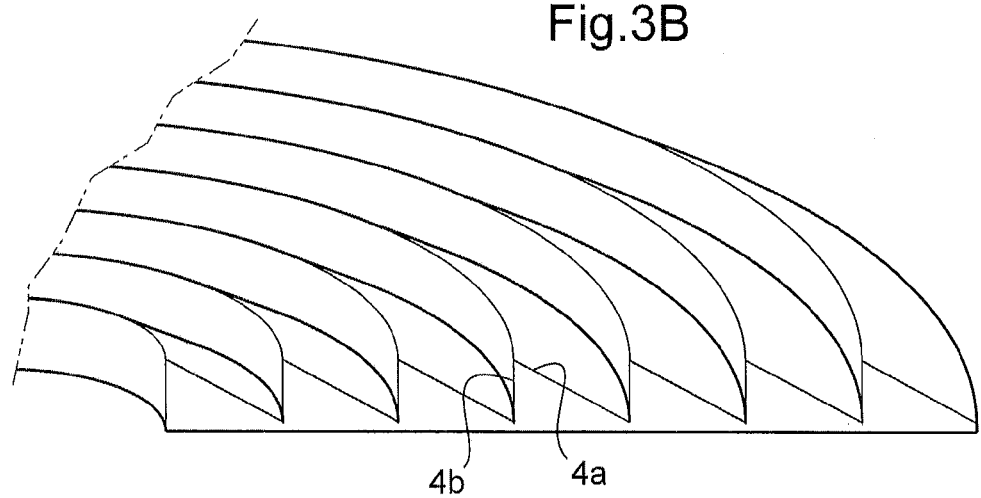

A Fresnel prism is a succession of prisms of small size of constant angle. These prisms are arranged contiguously, parallel to one another. FIG. 3A shows a perspective view of a conventional Fresnel prism made up of seven straight individual prisms. FIG. 3B shows an interesting variant of a Fresnel prism in which the individual prisms of the relief have an arched form.

In the lit glazing of the present invention, the individual prisms of said relief are preferably essentially parallel to the lit rim of the first sheet of glass. "Essentially parallel" should be understood here to mean that the prisms, when they are straight, form an acute angle less than 10° with the rim or, for curved prisms, as represented in FIG. 3B, the tangents to the curve all form with the rim of the first sheet an acute angle less than 10°.

Obviously, the shape of the area provided with a relief or bearing a flat structure with a relief is independent of the shape of the prisms. It is in fact quite possible to design a rounded area containing straight prisms or, conversely, a rectangular area made up of incurved prisms.

The Fresnel prism therefore comprises an alternation of oblique surfaces and surfaces essentially perpendicular to the base of the prism and to the general plane of the glazing. For the Fresnel prism to act effectively as deflector, the reflecting oblique surfaces of the Fresnel prism must be oriented toward the light source as will be explained in detail hereinbelow with reference to the figures.

When the deflector relief is situated not directly in the second main surface of the first sheet of glass but on a transparent flat structure applied to this second main surface, care should be taken to ensure that the light emitted by the light source and guided by the first sheet can enter freely into said transparent flat structure. For this, this transparent flat structure has to be in contact with the second main surface of the first sheet, over all of its surface opposite that provided with the reflecting relief. The contact interface must be non-reflecting. This non-reflecting nature can be obtained by ensuring that the contact interface is essentially free of a material having a refractive index $n_5<n_1$, and notably free of air ($n_{air}=1$).

The transparent flat structure can be glued, for example, by means of a transparent adhesive having a refractive index close to $n_1$. It is also possible to use for the transparent flat structure a thermoplastic polymer and to heat this polymer, before it is brought into contact with the first sheet, at least locally up to it softening point. Yet another possibility is to form the transparent flat structure by reaction injectionmolding (RIM) a mixture of monomers culminating in the formation of a polymer thermoset in situ.

The present invention thus makes it possible to extract light from the waveguide that is formed by the first sheet in the absence of any diffusing element used conventionally in this technical field. The absence of such a diffusing element is reflected in an improvement of the light output of the glazing. The glazing of the present invention consequently advantageously has no light diffusing element.

For aesthetic reasons, it is however possible to envisage arranging a diffusing element in the first sheet or on the first or second main face of the first sheet in immediate proximity to the textured area comprising the reflecting relief. For obvious reasons, this element must have a haze that is low enough for the total widths at mid-height of the angular distribution of the light intensity emitted by the system to be between 30° and 60°.

Figure 2:
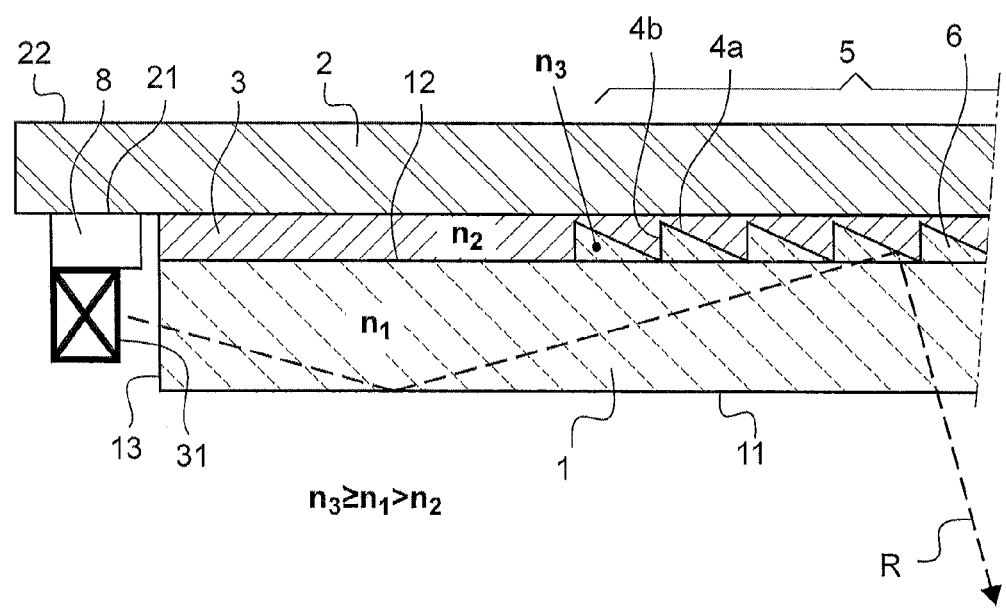

The present invention will now be explained in more detail with reference to the appended figures in which, FIG. 1 is a cross section of the edge of a first embodiment of a glazing according to the invention, FIG. 2 is a cross section of the edge of a second embodiment of a glazing according to the invention, FIG. 3A shows the shape of a relief of straight Fresnel prism type, FIG. 3B shows the shape of a relief of arched Fresnel prism type.

The glazing according to the invention represented in FIG. 1 is a single glazing comprising a first sheet of glass (1) with a first main face (11), a second main face (12) and a rim (13). The first sheet has an optical index $n_1$, generally close to 1.5. A light-emitting diode module (8) is positioned in such a way that the emitting face of the LEDs is facing the rim (13) of the first sheet. At a certain distance from the lit rim of the first sheet there is an area (5) of the second main face (12) of the first sheet which is textured, that is to say comprises a relief of Fresnel prism type, consisting of a plurality of individual prisms, each consisting of an oblique surface (4a) and a surface (4b) essentially perpendicular to the general plane of the first sheet. The hollows of the relief are filled with a material (7) with low optical index ($n_4 \ll n_1$), for example a silica-based mineral material formed in situ by a sol-gel method. All the second main face (12) of the first sheet is in adhesive contact with a transparent polymer film (3) of optical index $n_2 < n_1$ which also covers the mineral material (7).

Because the optical index $n_2$ of the separator (3) is less than the optical index $n_1$ of the first sheet, the latter operates as a waveguide for a light ray (R) emitted by the LED. When this ray (R) arrives at the relief of the textured area (5), it is not refracted by the interface in Fresnel prism form but is reflected by one of the oblique surfaces (4a). Since the reflecting oblique surfaces (4a) are all oriented toward the light source, this reflection of the light ray (R) takes place mostly toward a fairly limited space under the glazing.

FIG. 2 represents a cross section of the edge of a laminated glazing according to the invention. This glazing comprises a first sheet (1) with a first main face (11), a second main face (12) and a rim (13) and a second sheet (2) with a first main face (21) and a second main face (22). The transparent film (3) in adhesive contact with the first main face (21) of the second sheet and the second main face (12) of the first sheet here acts as lamination separator. Side-emitting LED modules (8) are placed on the first main face of the second sheet (21) in such a way that the emitting face of the LEDs is facing the rim (13) of the first sheet. The textured area (5) here corresponds not to a reflecting relief in the second main surface (12) of the first sheet, but to a planar and flat structure (6) provided with a reflecting relief. The optical index $n_3$ of this flat structure (6) is greater than or equal to $n_3$ and a light ray R which arrives at the interface between the first sheet (1) and the flat structure (6) is not reflected by this interface but enters into the flat structure. It is reflected only by one of the oblique surfaces (4a) of the reflecting interface that the relief forms in the area (5).

FIGS. 3A and 3B are provided mainly to illustrate two particularly preferred embodiments of the geometry of the reflecting relief of the area (5). The two figures represent Fresnel prisms, consisting of a plurality of individual prisms each having a surface (4b) that is essentially perpendicular to the plane of the base of the prism, and an oblique surface (4a). It is these oblique surfaces (4a) which will preferably be oriented toward the light source and will reflect the light in a direction roughly perpendicular to the plane of the glazing.

The invention claimed is:

1. A lighting glazing comprising:
   a first sheet of glass of refractive index $n_1$ with a first main face, a second main face and a rim;
   a transparent polymer film in adhesive contact with the second main face of the first sheet of glass, said transparent polymer film having a refractive index $n_2 < n_1$;
   a second sheet of glass with a first main face, a second main face and a rim, the transparent polymer film being in adhesive contact with the first main face of the second sheet of glass, and
   a light source positioned facing the rim of the first sheet of glass,
   wherein an area of the second main face of the first sheet of glass is provided with a specular reflecting textured surface, and
   wherein the specular reflecting textured surface is a textured surface of Fresnel lens type or of Fresnel prism type.

2. The lighting glazing as claimed in claim 1, wherein a height of the specular reflecting textured surface is between 5 μm and 1 mm.

3. The lighting glazing as claimed in claim 2, wherein the height of the specular reflecting textured surface is between 10 μm and 500μm.

4. The lighting glazing as claimed in claim 1, wherein a metallic layer is present on said specular reflecting textured surface.

5. The lighting glazing as claimed in claim 1, wherein the refractive index $n_2$ of the transparent polymer film is less by at least 0.02 than the index $n_1$ of the first sheet of glass.

6. The lighting glazing as claimed in claim 1, wherein a coating of low index having a refractive index $n_4$ less by at least 0.02 than the index $n_1$ of the first sheet of glass is present on said specular reflecting textured surface.

7. The lighting glazing as claimed in claim 6, wherein the refractive index $n_4$ is less by at least 0.1 than the index $n_1$ of the first sheet of glass.

8. The lighting glazing as claimed in claim 1, wherein the specular reflecting textured surface is a textured surface of Fresnel prism type, the individual prisms of said textured surface being essentially parallel to the lit rim of the first sheet of glass.

9. The lighting glazing as claimed in claim 1, wherein the specular reflecting textured surface is a textured surface of Fresnel prism type, the individual prisms of said textured surface having an arched form.

10. A vehicle, comprising a lighting glazing as claimed in claim 1.

11. The vehicle as claimed in claim 10, wherein the lighting glazing forms part of the roof of the vehicle.

12. The lighting glazing as claimed in claim 1, wherein the light source includes a light-emitting diode module.

13. A lighting glazing comprising:
a first sheet of glass of refractive index $n_1$ with a first main face, a second main face and a rim;
a transparent polymer film in adhesive contact with the second main face of the first sheet of glass, said transparent polymer film having a refractive index $n_2 < n_1$;
a second sheet of glass with a first main face, a second main face and a rim, the transparent polymer film being in adhesive contact with the first main face of the second sheet of glass, and
a light source positioned facing the rim of the first sheet of glass,
wherein an area of the second main face of the first sheet of glass is covered with a transparent flat structure, of refractive index $n_3$ greater than or equal to $n_1$, provided with a specular reflecting textured surface.

14. The lighting glazing as claimed in claim 13, wherein the transparent flat structure is a film of plastic material, or a silica-based mineral or organo-mineral coating obtained by sol-gel pathway.

15. The lighting glazing as claimed in claim 14, wherein the plastic material is poly(ethylene terephthalate), polycarbonate, poly(methylmethacrylate), or polystyrene.

16. The lighting glazing as claimed in claim 13, wherein a height of the specular reflecting textured surface is between 5 μm and 1 mm.

17. The lighting glazing as claimed in claim 16, wherein the height of the specular reflecting textured surface is between 10 μm and 500 μm.

18. The lighting glazing as claimed in claim 13, wherein a metallic layer is present on said specular reflecting textured surface.

19. The lighting glazing as claimed in claim 13, wherein the refractive index $n_2$ of the transparent polymer film is less by at least 0.02 than the index $n_3$ of the transparent flat structure.

20. The lighting glazing as claimed in claim 13, wherein a coating of low index having a refractive index $n_4$ less by at least 0.02 than the index $n_3$ of the transparent flat structure is present on said specular reflecting textured surface.

21. The lighting glazing as claimed in claim 20, wherein the refractive index $n_4$ is less by at least 0.1 than the index $n_3$ of the transparent flat structure.

22. The lighting glazing as claimed in claim 13, wherein the specular reflecting textured surface comprises geometrical patterns consisting of flat or curved surfaces.

23. The lighting glazing as claimed in claim 22, wherein the specular reflecting textured surface is a regular textured surface with repetitive geometrical patterns.

24. The lighting glazing as claimed in claim 13, wherein the specular reflecting textured surface is a textured surface of Fresnel lens type or of Fresnel prism type.

25. A vehicle, comprising a lighting glazing as claimed in claim 13.

26. The vehicle as claimed in claim 25, wherein the lighting glazing forms part of the roof of the vehicle.

27. The lighting glazing as claimed in claim 13, wherein the light source includes a light-emitting diode module.

* * * * *

UNITED STATES PATENT AND TRADEMARK OFFICE
CERTIFICATE OF CORRECTION

PATENT NO. : 9,746,600 B2
APPLICATION NO. : 14/399826
DATED : August 29, 2017
INVENTOR(S) : Laetitia Massault et al.

Page 1 of 1

It is certified that error appears in the above-identified patent and that said Letters Patent is hereby corrected as shown below:

On the Title Page

Item (72) Inventors:
The 4th inventor's name is spelled incorrectly and should read:
Adèle VERRAT DEBAILLEUL Item (56) References Cited, FOREIGN PATENT DOCUMENTS:
The reference, JP 2009-540603 A, should read JP 2009-540503 A Signed and Sealed this
Thirty-first Day of October, 2017

Joseph Matal
*Performing the Functions and Duties of the
Under Secretary of Commerce for Intellectual Property and
Director of the United States Patent and Trademark Office*